Figure 4:
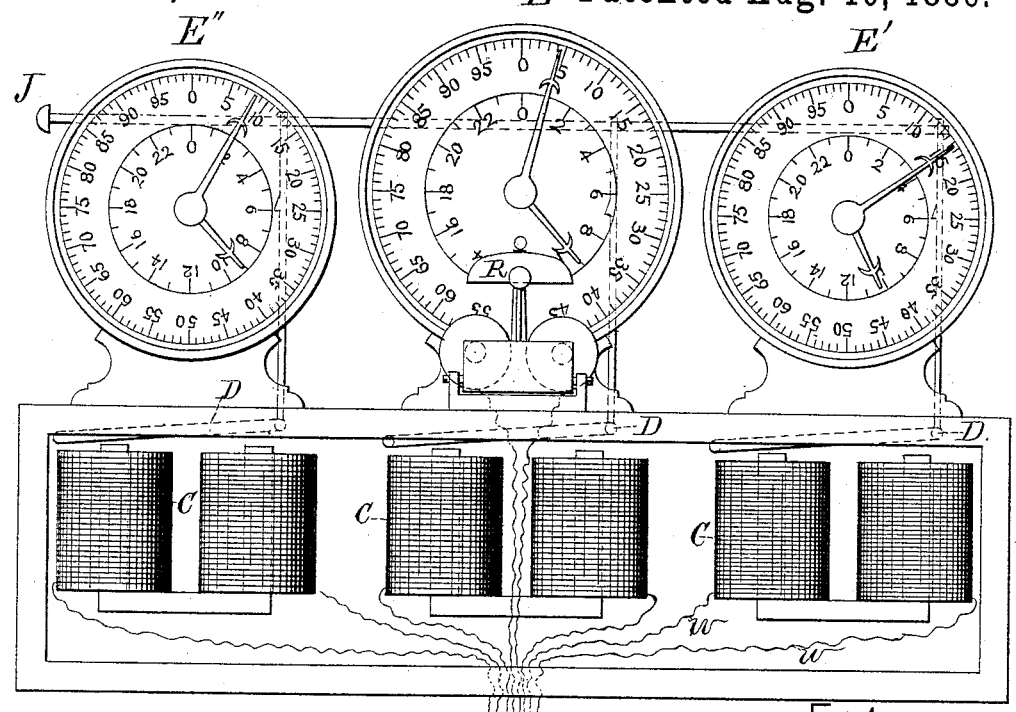

(No Model.) 3 Sheets—Sheet 1.
G. W. HEY.
AUTOMATIC ELECTRIC BARREL REGISTER.
No. 347,038. Patented Aug. 10, 1886.
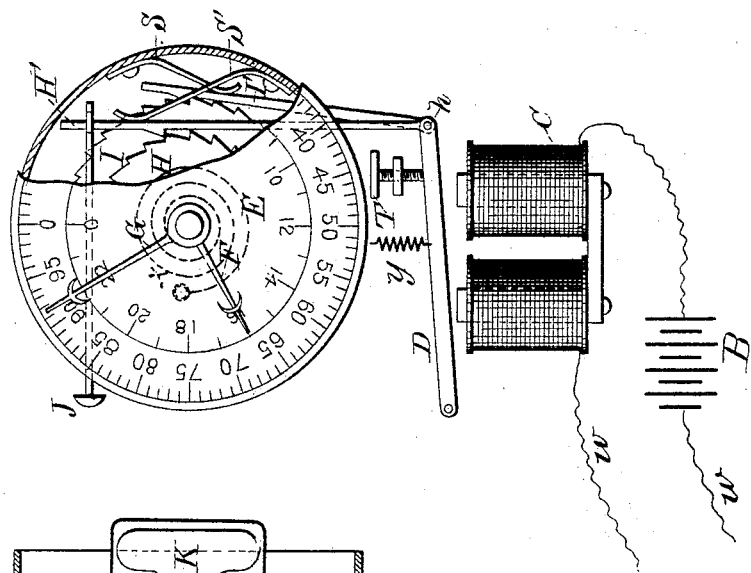
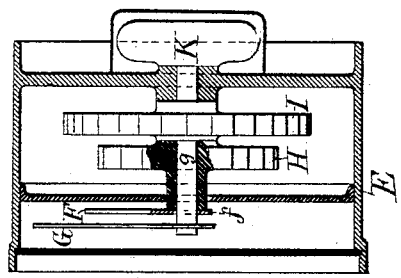
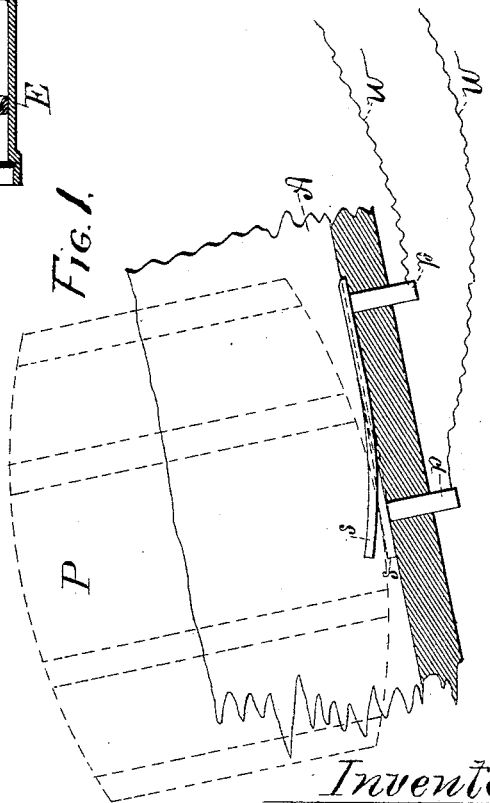
Witnesses
Inventor:
George W. Hey (No Model.) 3 Sheets—Sheet 2.

G. W. HEY.
AUTOMATIC ELECTRIC BARREL REGISTER.

No. 347,038. Patented Aug. 10, 1886.

Witnesses.

Inventor.

(No Model.) 3 Sheets—Sheet 3.

G. W. HEY.
AUTOMATIC ELECTRIC BARREL REGISTER.

No. 347,038. Patented Aug. 10, 1886.

Witnesses.
Wm. C. Raymond
C. Bendyson

Inventor.
George W. Hey

UNITED STATES PATENT OFFICE.

GEORGE W. HEY, OF SYRACUSE, ASSIGNOR OF ONE-HALF TO MATTHEW J. DOLPHIN, OF BROOKLYN, NEW YORK.

AUTOMATIC ELECTRIC BARREL-REGISTER.

SPECIFICATION forming part of Letters Patent No. 347,038, dated August 10, 1886.

Application filed October 6, 1884. Serial No. 144,881. (No model.)

*To all whom it may concern:*

Be it known that I, GEORGE W. HEY, of Syracuse, in the county of Onondaga, in the State of New York, have invented new and useful Improvements in Automatic Electric Counting and Registering Apparatus, of which the following, taken in connection with the accompanying drawings, is a full, clear, and exact description.

This invention relates to improvements in counting and registering devices, and has for its object the automatic counting of barrels, casks, &c., as they are slid on skids in loading them onto wagons, and in simultaneously registering each and every cask passing over the skid, so that the number of packages and capacity of each is indicated on the dials of the registering device, which, for convenience, may be located in desirable proximity to the entry-clerk.

To this end the invention consists in a skid having a V-shaped trough or way, through which the casks are slid lengthwise. This V-shaped skid is graduated so that different-sized casks can slide thereon. An electric switch consisting of a spring-metal finger rigidly secured at one end to the skid against one pole of the circuit is arranged at the proper point on the interior of the skid in position to be encountered by the cask. This encounter presses the free end of the finger against a metal point forming the other pole of the circuit, thereby closing the circuit, which, by means of an electro-magnet and an armature connected with the registering apparatus, registers the passing cask.

It consists, also, in a hinged skid pivoted to its inner support, so that when the outer end is swung up off the wagon an electric bell located on the register platform announces the completion of the loading.

It further consists in a register the indicators of which are connected to an armature, so that one indicator shows the number of packages taken on the load, while the other counts continuously, both being simultaneously operated from the same armature and its magnet as the circuit is made by the passage of the package over the skids.

It also consists in the details of construction, all as hereinafter described, and pointed out in the claims.

In specifying my invention reference is had to the accompanying drawings, in which the same letters indicate the same or corresponding parts in all the figures.

Figure 5:
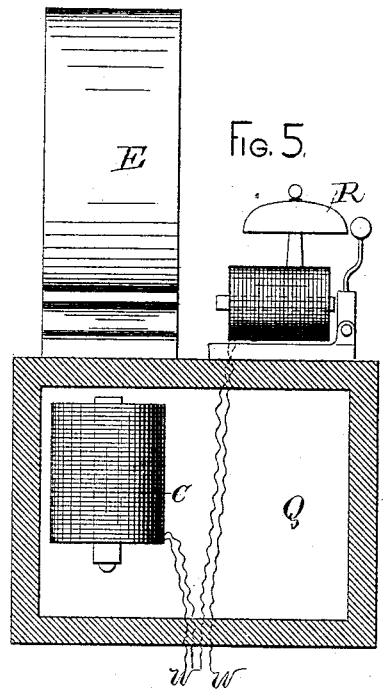
Figure 6:
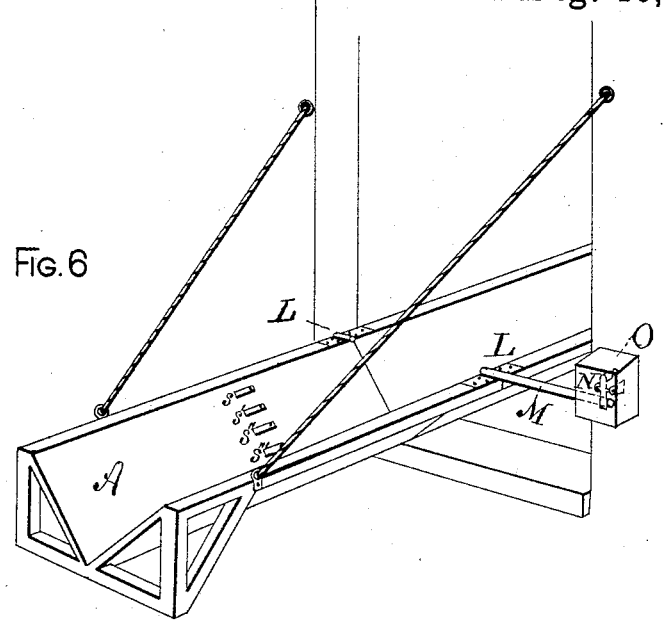
Figure 7:
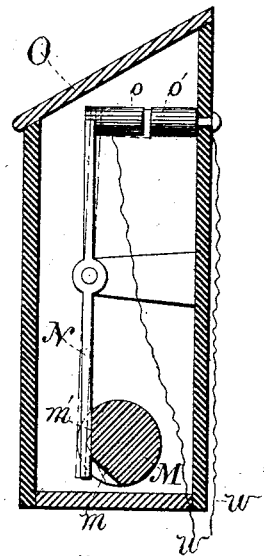

Figure 1 is a longitudinal vertical section of a portion of the skid, showing one of the electric switches consisting of the spring-finger and its polarized connections, the full lines showing its neutral position, the circuit being open, and the dotted lines showing the finger depressed by the encounter with the passing cask, and the circuit closed. Fig. 2 shows the electro-magnet, armature, battery, and the registering apparatus connected with the armature. Fig. 3 is a detached view of the register, partly in section, showing the ratchet-disks and shafts and the indicators and their shafts. Fig. 4 shows the registers and their connections mounted in place for use in counting and registering the number of and sizes of the packages moved over the skid. Fig. 5 is a sectional view on line 5 5 of Fig. 4. Fig. 6 shows the hinged skid hung in position for use, also the attachment for making the circuit with the electric bell. Fig. 7 shows the switch device and its connections for making the circuit with the bell, and Fig. 8 shows a transverse section of the skid and illustrates the arrangement of the electric switches in the skid in proper position to be encountered by different-sized packages.

Figure 8:
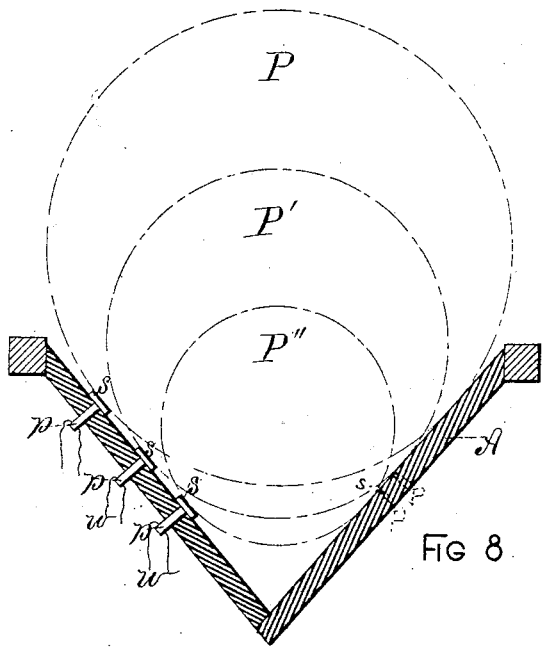

The letter A represents the skid, which may be of any suitable form, but I prefer to employ the V form illustrated, as it can readily be graduated to receive casks or packages of different diameters, as illustrated by dotted lines in Fig. 8. At the point of impingement of the cask with the skid, such point being usually at the bung diameter, are placed fingers or strips of spring metal, $s$, one end of which is secured firmly to one pole of an electric circuit, as shown in Fig. 1, the other being bent upward and terminating over the other pole of the switch, so that when the cask slides over the finger $s$ the free end thereof is depressed, and, coming in contact with the pole P, closes the circuit. Immediately on its release the spring-finger rises to its neutral position and opens the circuit. The circuit made by the passing cask is utilized, as hereinafter explained, to count and register the casks passed over the skid. The spring fingers or switches are arranged in the same skid in proper position to be encountered by different-sized packages—as a barrel, half-barrel, quarter or double casks, and each finger and switch makes a separate circuit.

The skid A can be constructed in two parts, as shown in Fig. 6, hinged together at L, and the shaft or pintle M of the hinge extended, as shown in Fig. 6, a cam, $m\ m'$, Fig. 7, formed on the outer end of said shaft, being utilized to make circuit with an electric bell.

The arrangement of the switch device, operated by the cam $m\ m'$ on the shaft M, will be readily understood upon reference to Fig. 7 of the drawings. A pivoted rod, N, carrying the block $o$, is caused by the cam to come in contact with the block $o'$ when the skid A is swung up.

The cam-rod N and the switch-block are housed in the box O to protect them.

B is the battery in circuit with the skids and the electro-magnet armature and registers.

The register E is constructed as shown in the detached sectional view, Fig. 3, and has a ratchet-disk, H, carrying the indicator-hand F. A pawl-hook, H', connected with the armature D at $h$, operates the disk H, and its indicator registering by the fingers on the dial the number of times the circuit is made with the skid, and consequently the number of articles which have passed over the skid. A push-button, J, bears against the pawl-hook H' at its upper end, and serves, when pressed, to release the ratchet-disk H from engagement with the pawl, and permits the spring $x$ (shown in dotted lines) to retract the disk H and its indicator F to the zero-mark. A spring, S', presses the hook H' back into engagement with the ratchet-disk H when pressure on the button J is released. A second and larger ratchet-disk, I, arranged back of the disk H, is actuated by a pawl-hook, I', connected to the armature D, also at $h$. Simultaneously with the disk H, this disk I carries the indicator-hand G, and is employed as a check against errors in reading off the number indicated by the small hand F on the dial. The indicator of the ratchet-disk I may be returned to the zero-mark of the dial by turning the knob K, Fig. 3.

Fig. 3 shows the arrangement of the indicator-shafts, the shaft $f$ being tubular and slipping over the shaft $g$. The turn-knob $k$ is inclosed to prevent unauthorized access thereto. The armature D has a thumb-screw, T, for adjusting its throw, and a spring, $y$, for retracting it when the circuit is broken. The electro-magnet C is of the usual construction. The electric bell R is in circuit with the switch device shown in Fig. 7.

In order that different-sized casks passed over the skids A may be counted and automatically registered, I arrange the spring-fingers in the V-skid as described, and provide a register for each sized cask, as shown in Fig. 4.

The operation of the apparatus is as follows, viz: the skid A, being erected at the shipping-door, is lowered to the wagon. The cam $m\ m'$, making circuit with the bell R as the shaft M turns, announces the lowering of the skids for a load to the entry-clerk. The barrels or packages are then slid on the wagon over the skid, making circuit with the registering device, indicating the size of the cask by reason of its contact with the switch located on the skid in position to be encountered by that sized package. As soon as the circuit is made, the indicator-hands of the register move one notch and point to the figure on the dial, showing the number moved over the skids. The small hand F in the illustrated example of my invention is designed to count and register the number of casks taken on the load, while the large hand G counts continuously up to 100 or any desired number, thus keeping a check upon the reading of the number transferred from the dial of the small hand. When the loading is completed, the swinging up of the skid again brings the bell into circuit, and its ringing calls attention to the register, and after the dials are read off and entered a pressure on the button J returns the small hands of all the registers to the zero-mark of the dials.

It will be understood that when the series of registers E, E', E'', &c., are employed, the push-button J is to be connected to all, as shown in Fig. 4, and that the registers are to be mounted upon a convenient table or platform, as shown in Figs. 4 and 5, in which the magnets and armature are inclosed as shown.

It will be observed that other arrangements of the spring-fingers $s$ are permissible—as, for example, they may be arranged zigzag on opposite sides of the skids; also, that the form of the skids may be varied without departing from my invention. I do not, therefore, limit myself to the form and construction shown.

Having thus described my invention, what I claim as new, and desire to secure by Letters Patent, is—

1. A counting and registering apparatus consisting of a skid or way supporting the article to be counted and registered, electric-circuit closers located in said skid or way, whereby an electric circuit may be closed by contact with the article in transit, a register for indicating the number of articles passed over said skid or way, and a magneto-electric motor in said electric circuit to operate said register, substantially as described.

2. The combination of the graduated V-shaped skid A, having electric switches, as S, arranged therein so as to encounter casks of different sizes, as P P' P'', &c., when moved over said skid, with the registering-dials E E' $E^2$, &c., and their actuating magneto-electric motor, substantially as and for the purpose set forth.

3. The combination of the hinged skid A, and the shaft M, so connected to the skid that said shaft is caused to turn with the movement of the skid on its hinges, and cams $m\ m'$ on shaft M, with a pivoted circuit-closer, substantially as and for the purpose set forth.

4. The combination of the hinged skid, substantially as described, with a pivoted circuit-closer and means, as described, for operating the same, and an electric bell in said circuit, all arranged to operate or ring said bell when the skid is moved up or down on its hinges, substantially as and for the purpose set forth.

5. An indicating-register comprising a pair of synchronously-moving disks, one sleeved upon the other, and each provided with an indicating-hand, a double graduated scale-dial, and independent actuating mechanism connected to each of said disks, whereby either indicator-finger may be retracted to the zero-mark without affecting the other, substantially as specified.

6. In an indicating-register, the combination of two independently-mounted synchronously-moving disks provided with indicators, a retracting-spring connected to one of said disks, and a push-rod engaging one of the actuating-pawls, whereby the said pawl may be disengaged from its disk, said disk being returned to the zero-point on the dial, substantially as and for the purpose set forth.

In testimony whereof I have hereunto signed my name, in the presence of two attesting witnesses, at Syracuse, in the county of Onondaga, in the State of New York, this 29th day of September, 1884.

GEORGE W. HEY.

Witnesses:
C. BENDIXON,
FREDERICK H. GIBBS.